United States Patent
Park et al.

(10) Patent No.: US 11,270,588 B2
(45) Date of Patent: Mar. 8, 2022

(54) SERVER AND CONTROL METHOD FOR THE SAME

(71) Applicants: Hyundai Motor Company, Seoul (KR); Kia Motors Corporation, Seoul (KR)

(72) Inventors: Minjae Park, Gyeonggi-do (KR); Jong Bok Lee, Gyeonggi-do (KR); Seunghyun Woo, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/024,844

(22) Filed: Sep. 18, 2020

(65) Prior Publication Data
US 2021/0287545 A1   Sep. 16, 2021

(30) Foreign Application Priority Data
Mar. 16, 2020   (KR) .................. 10-2020-0031707

(51) Int. Cl.
| | |
|---|---|
| B60W 50/14 | (2020.01) |
| G08G 1/16 | (2006.01) |
| H04W 4/40 | (2018.01) |
| H04W 4/029 | (2018.01) |

(52) U.S. Cl.
CPC .............. G08G 1/166 (2013.01); H04W 4/029 (2018.02); H04W 4/40 (2018.02)

(58) Field of Classification Search
CPC ......... G08G 1/166; H04W 4/40; H04W 4/029
See application file for complete search history.

(56) References Cited

U.S. PATENT DOCUMENTS

| | | | | |
|---|---|---|---|---|
| 8,352,112 | B2* | 1/2013 | Mudalige | G08G 1/164 701/24 |
| 8,547,249 | B2* | 10/2013 | David | G08G 1/166 340/903 |
| 2010/0256836 | A1* | 10/2010 | Mudalige | G08G 1/164 701/2 |
| 2016/0280134 | A1* | 9/2016 | Miura | B60Q 9/008 |
| 2017/0057411 | A1* | 3/2017 | Heath | B60W 40/09 |
| 2018/0075747 | A1* | 3/2018 | Pahwa | B60W 30/0956 |
| 2018/0365999 | A1* | 12/2018 | Wiklinska | G08G 1/164 |
| 2019/0213881 | A1* | 7/2019 | Bender | B60W 50/14 |
| 2020/0035103 | A1* | 1/2020 | Siboni | G08G 1/005 |
| 2020/0361483 | A1* | 11/2020 | Yonushonis | B60W 50/14 |

FOREIGN PATENT DOCUMENTS

KR   10-2018-0066663 A   6/2018

* cited by examiner

*Primary Examiner* — Munear T Akki
(74) *Attorney, Agent, or Firm* — Mintz Levin Cohn Ferris Glovsky and Popeo, P.C.; Peter F. Corless

(57) ABSTRACT

A server and a controlling method of the same provides notification information about risk level by determining risk level for personal mobility based on information received from personal mobility and vehicle. The vehicle includes a communicator and a controller that determines risk level for personal mobility based on personal mobility information received from the personal mobility, vehicle information received from vehicle located within a preset radius from the personal mobility, and congestion level of driving road of the personal mobility. The controller operates the communicator to transmit notification information corresponding to the risk level to the vehicle.

18 Claims, 9 Drawing Sheets

SERVER AND CONTROL METHOD FOR THE SAME

CROSS-REFERENCE TO RELATED APPLICATION(S)

This application is based on and claims priority under 35 U.S.C. § 119 to Korean Patent Application No. 10-2020-0031707, filed on Mar. 16, 2020 the disclosure of which is incorporated by reference in its entirety.

BACKGROUND

1. Technical Field

The present disclosure relates to a personal mobility, a server capable of transmitting and receiving information with a vehicle or a user terminal device, and a controlling method thereof.

2. Description of the Related Art

Recently, as the market for personal mobility corresponding to a power-driven single-person vehicle has increased, users using personal mobility on the road are increasing. A person mobility may be driven not only on sidewalks, but also on roads on which vehicles are driven, and based on a small size thereof, may be driven between vehicles on the roads. As described above, personal mobility, even when the vehicle is blocked, may move quickly between vehicles, but due to the small size thereof, it may not be identified by the vehicle driver, and thus there is a risk of collision with the vehicle.

SUMMARY

In view of the above, an aspect of the present disclosure provides a vehicle and a control method thereof providing notification information for a risk level by determining the risk level for personal mobility based on information received from vehicle and personal mobility. In accordance with an aspect of the present disclosure, a server may include a communicator; a controller configured to determine a risk level for a personal mobility based on personal mobility information received from the personal mobility, vehicle information received from vehicle located within a preset radius from the personal mobility, and congestion level of driving road of the personal mobility, and operate the communicator to transmit notification information corresponding to the risk level to the vehicle.

The controller may be configured to determine the risk level by summing numerical values corresponding to each of the personal mobility information, the vehicle information, and the congestion level. The personal mobility information may include at least one of user information of the personal mobility, condition information of the personal mobility, and driving information of the personal mobility. The user information of the personal mobility may include at least one of information regarding whether to wear a helmet measured from sensor of the personal mobility, information regarding boarding personnel, or information regarding whether to look ahead. The condition information of the personal mobility may include at least one of type of the personal mobility, size of the personal mobility, or aging degrees of the personal mobility. The driving information of the personal mobility may include at least one of speed of the personal mobility, a movement path of the personal mobility or a driving position of the personal mobility. The controller may be configured to determine numerical values corresponding to the movement path of the personal mobility as a maximum value by determining that the movement path of the personal mobility is between the vehicles when the speed of the vehicle is less than the speed of the personal mobility and the congestion degree is greater than a preset reference value.

The controller may be configured to determine the danger degree of the personal mobility based on the personal mobility information, a pedestrian information received from user terminal of the pedestrian located with a preset radius from the personal mobility, and congestion degree of pavement, and may be configured to operate the communicator to transmit notification information corresponding to the danger degree to the user terminal when the driving position of the personal mobility is the pavement. The pedestrian information may include at least one of position of the pedestrian or speed of the pedestrian. The vehicle information may include at least one of position of the vehicle or speed of the vehicle.

In accordance with an aspect of the present disclosure, a controlling method of a server including a communicator may include determining risk level for personal mobility based on personal mobility information received from the personal mobility, vehicle information received from vehicle located within a preset radius from the personal mobility, and congestion level of driving road of the personal mobility, and operating the communicator to transmit notification information corresponding to the risk level to the vehicle.

Determining the risk level for the personal mobility may include determining the risk level by summing numerical values corresponding to each of the personal mobility information, the vehicle information, and the congestion level. The personal mobility information may include at least one of user information of the personal mobility, condition information of the personal mobility, and driving information of the personal mobility. The user information of the personal mobility may include at least one of information regarding whether to wear a helmet measured from sensor of the personal mobility, information regarding boarding personnel, or information regarding whether to look ahead. The condition information of the personal mobility may include at least one of type of the personal mobility, size of the personal mobility, or aging degrees of the personal mobility. The driving information of the personal mobility may include at least one of speed of the personal mobility, a movement path of the personal mobility or a driving position of the personal mobility.

Determining the danger degree of the personal mobility may include: determining numerical values corresponding to the movement path of the personal mobility as a maximum value by determining that the movement path of the personal mobility is between the vehicles when the speed of the vehicle is less than the speed of the personal mobility and the congestion degree is greater than a preset reference value.

The method may further include determining the danger degree of the personal mobility based on the personal mobility information, a pedestrian information received from user terminal of the pedestrian located with a preset radius from the personal mobility, and congestion degree of pavement, and operating the communicator to transmit notification information corresponding to the danger degree to the user terminal when the driving position of the personal mobility is the pavement. The pedestrian information may include at least one of position of the pedestrian or speed of the pedestrian. The vehicle information may include at least one of position of the vehicle or speed of the vehicle.

In accordance with an aspect of the present disclosure, a server may include a communicator; and a controller configured to determine a movement path for personal mobility based on personal mobility information received from the personal mobility and vehicle information received from vehicle positioned within a preset radius from the personal mobility, and operate the communicator to transmit a notification information corresponding to the movement path to the vehicle.

The controller may be configured to determine a relative position and a relative speed of the vehicle between the vehicle and the personal mobility when the driving position of the personal mobility is a general road, determine the movement path of the personal mobility as between vehicles when the relative position is less than the reference distance and the relative speed is greater than the reference speed, and operate the communicator to transmit notification information warning approach of the personal mobility. The controller may be configured to determine movement path for the personal mobility based on the personal mobility information and pedestrian information received from a user terminal located within a preset radius from the personal mobility, and operate the communicator to transmit notification information corresponding to the movement path to the user terminal.

The controller may be configured to determine a relative position and a relative speed between the personal mobility and the user terminal, and determine the movement path of the personal mobility as located between pedestrians when the relative position is less than a reference distance and the relative speed is greater than a reference speed, and operate the communicator to transmit notification information warning approach of the personal mobility when the driving position of the personal mobility is pavement.

According to a server and a controlling method according to one aspect, by determining the risk for personal mobility based on personal mobility and information received from the vehicle and providing notification information about the risk, it may be possible to prevent an accident between the personal mobility and the vehicle.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
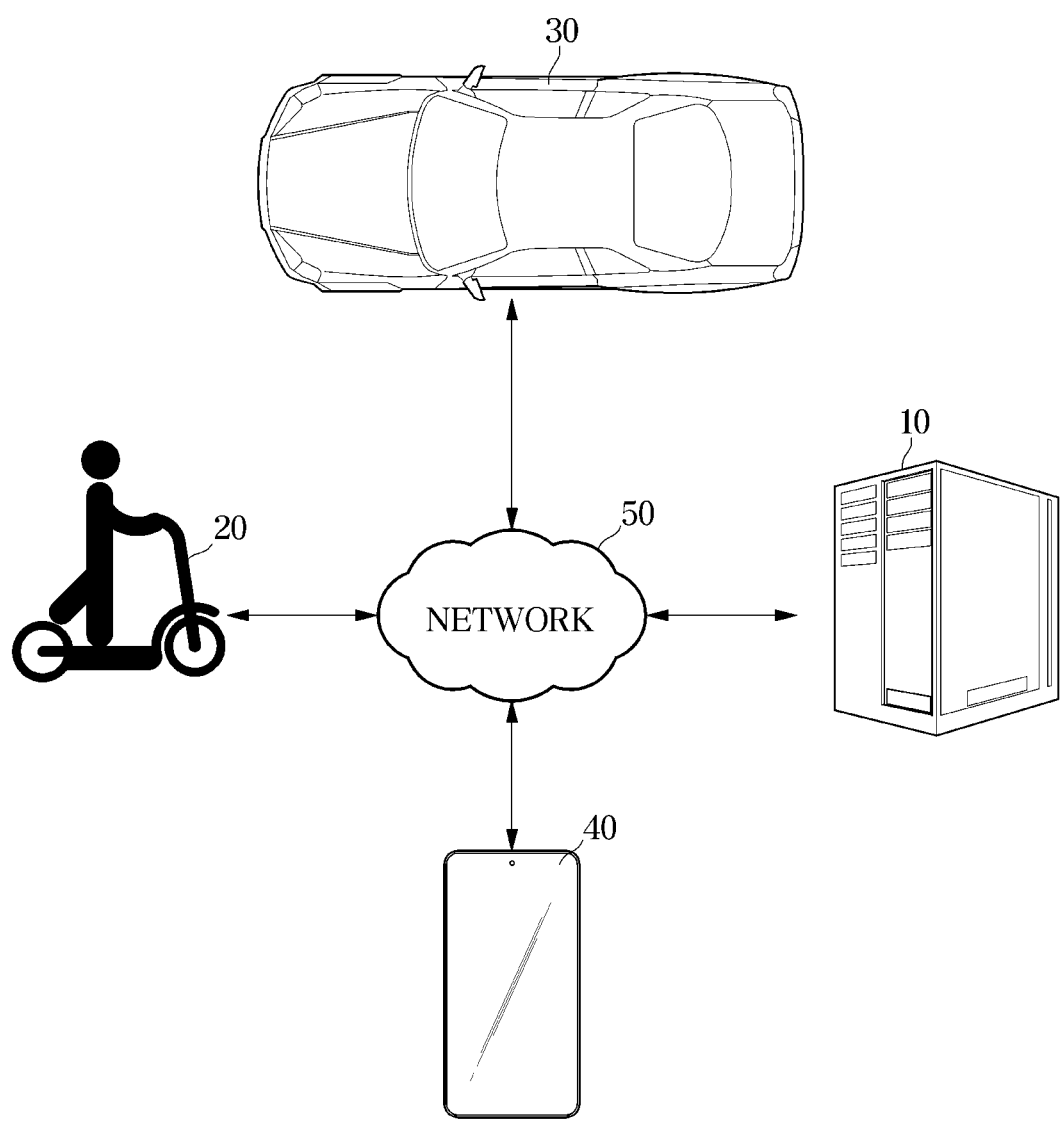
FIG. 1 illustrates a block diagram of a configuration of a risk notification system according to an exemplary embodiment.

Like reference numerals refer to like elements throughout. The present disclosure does not describe all elements of the exemplary embodiments, and overlaps between the general contents or the embodiments in the technical field to which the present invention belongs.

This specification does not describe all elements of the exemplary embodiments of the present disclosure and detailed descriptions on what are well known in the art or redundant descriptions on substantially the same configurations may be omitted. The term 'part, module, member, block' used in the specification may be implemented in software or hardware, and a plurality of 'part, module, member, block' may be embodied as one component, It is also possible that one 'part, module, member, block' includes a plurality of components.

Throughout the specification, when an element is referred to as being "connected to" another element, it may be directly or indirectly connected to the other element and the "indirectly connected to" includes being connected to the other element via a wireless communication network.

In addition, when a part is said to "include" a certain component, this means that it may further include other components, except to exclude other components unless otherwise stated. Throughout the specification, when a member is located "on" another member, this includes not only when one member is in contact with another member but also when another member exists between the two members. The terms first, second, etc. are used to distinguish one component from another component, and the component is not limited by the terms described above. Singular expressions include plural expressions unless the context clearly indicates an exception.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In each step, the identification code is used for convenience of description, and the identification code does not describe the order of each step. Each of the steps may be performed out of the stated order unless the context clearly dictates the specific order. Hereinafter, with reference to the accompanying drawings will be described the working principle and embodiments of the present invention.

FIG. 1 illustrates a block diagram of a configuration of a risk notification system according to an exemplary embodiment. Referring to FIG. 1, the risk level notification system 1 according to an exemplary embodiment may include a server 10, personal mobility 20, a vehicle 30, a user terminal 40 and the network 50.

The server 10 according to an exemplary embodiment may be configured to determine the risk level for the personal mobility 20 based on the information received from the personal mobility 20, the vehicle 30 and the user terminal 40, and transmit notification information corresponding to the risk level to the vehicle 30 or the user terminal 40. The personal mobility 20 is a power-driven single-person vehicle, and may include an electric wheel, an electric kickboard, an electric bicycle, and a miniature electric vehicle. The type of personal mobility 20 is not limited to the above example, and is included without limitation as long as it is a single-person vehicle powered by electricity.

The personal mobility 20 according to an exemplary embodiment may be configured to transmit personal mobility information related to the personal mobility 20 to the server 10, and according to an exemplary embodiment, may be configured to receive notification information corresponding to a risk level from the server 10. The vehicle 30 may correspond to a vehicle located within a preset radius from the personal mobility 20. In other words, the vehicle 30 is a vehicle positioned around the personal mobility 20 and may correspond to a vehicle having a possibility of collision with the personal mobility 20.

The vehicle 30 according to an exemplary embodiment may be configured to transmit vehicle information related to the vehicle 30 to the server 10 and receive notification information corresponding to a risk level from the server 10. The user terminal 40 may correspond to a user terminal of a pedestrian located within a preset radius from the personal mobility 20. In other words, the user terminal 40 is a pedestrian located around the personal mobility 20, and may correspond to a user terminal of a pedestrian who may collide with the personal mobility 20.

The user terminal 40 is a terminal device carried by a user, and may be a mobile phone, a smart phone, or a portable computer (e.g., notebook, tablet, etc.). The type of the user terminal 40 is not limited to the above example, and is not limited as long as it is a terminal device that the user carries and performs communication with the server 10 and may display content. The user terminal 40 according to an exemplary embodiment may be configured to transmit pedestrian information related to a pedestrian to the server 10 and receive notification information corresponding to a risk level from the server 10.

The network 50 according to an exemplary embodiment may support wireless communication between the server 10, the personal mobility 20, the vehicle 30, and the user terminal 40, and it may be at least one of a telecommunication network, for example, a computer (e.g. LAN or WAN), the Internet, or a telephone network. However, the type of the network 50 is not limited to the above example, and may be included without limitation as long as it is a network for communication support.

Figure 2:
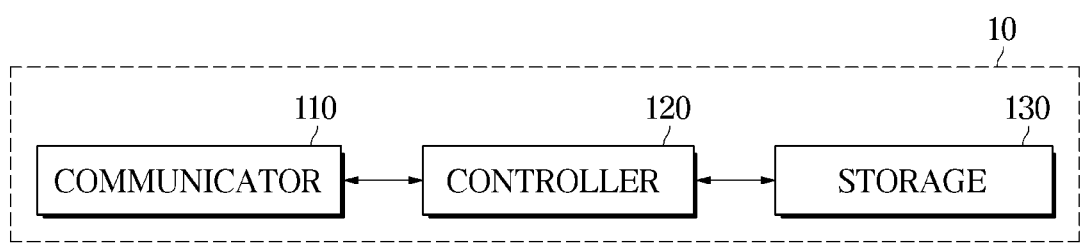
FIG. 2 illustrates a control block diagram of server according to an exemplary embodiment.

FIG. 2 illustrates a control block diagram of server 10 according to an exemplary embodiment. Referring to FIG. 2, server 10 according to one exemplary embodiment may include a communicator 110 configured to perform communication with the personal mobility 20, the vehicle 30 and the user terminal 40 via the network 50, a controller 120 configured to determine a risk level for the personal mobility 20 based on the received information, and operate the communicator 110 to transmit notification information corresponding to the risk level, a storage 130 including various information necessary for control of the server 10

The communicator 110 according to an exemplary embodiment may be connected to the network 50 by wire or wirelessly to transmit and receive data to and from the personal mobility 20, the vehicle 30, and the user terminal 40. The controller 120 according to an exemplary embodiment may be configured to determine the risk for personal mobility 20 based on the personal mobility information received from the personal mobility 20, the vehicle information received from the vehicle 30 located within a preset radius from the personal mobility 20, and the congestion of the driving road of the personal mobility 20.

At this time, the risk level for the personal mobility 20 may be a measure that indicates the likelihood of collision with the personal mobility 20 and the scale of accidents when the personal mobility 20 collides with each other. Specifically, the controller 120 may be configured to determine a risk level by summing numerical values corresponding to each of personal mobility information, vehicle information, and congestion level.

The personal mobility information may include at least one of user information of the personal mobility 20, status information of the personal mobility 20, and driving information of the personal mobility 20. The user information of the personal mobility 20 may include information about the user operating the personal mobility 20. The user information of the personal mobility 20 may include at least one of information regarding whether a helmet is worn from a sensor (not shown) of the personal mobility 20, information regarding the occupant, or whether the person is looking ahead.

In addition, the state information of the personal mobility 20 is information indicating the current state of the personal mobility 20, among at least one of types of the personal mobility 20, the size of the personal mobility 20, or the degree of aging of the personal mobility 20. The status information of the personal mobility 20 is information indicating the current status of the personal mobility 20, and may include at least one of the type of the personal mobility 20, the size of the personal mobility 20 or the degree of aging of the personal mobility 20.

Further, the driving information of the personal mobility 20 is information related to the driving of the personal mobility 20, and may include at least one of the speed of the personal mobility 20, the travel path of the personal mobility 20 or the driving position of the personal mobility 20, and may be determined based on a global positioning system (GPS) signal received from the personal mobility 20. At this time, the controller 120 may be configured to determine a numerical value corresponding to each information based on each information included in the personal mobility information.

For example, if the speed of the vehicle 30 is less than the speed of the personal mobility 20 and the congestion is greater than a preset reference value, the controller 120 may be configured to determine that the movement path of the personal mobility 20 is between the vehicles 30, and the numerical value corresponding to the movement path of the personal mobility 20 may be determined as the maximum value. In addition, the controller 120 may be configured to determine a numerical value that corresponds to personal mobility information by summing the numerical values determined corresponding to each information.

Accordingly, the controller 120 may be configured to determine a numerical value that corresponds to the personal mobility information by determining a numerical value for each information included in the personal mobility information, and finally determine a risk level for the personal mobility 20. The vehicle information may include at least one of the location of the vehicle 30 or the speed of the vehicle 30, and may be determined based on a global positioning system (GPS) signal received from the vehicle 30.

The vehicle information may be received from all vehicles 30 existing within a preset radius around the personal mobility 20, which is the object of risk level determination. Specifically, the server 10 may use only vehicle information corresponding to the vehicle 30 existing within a preset radius to determine the risk level for the personal mobility 20 based on the position of the vehicle 30 included in the vehicle information, focusing on the personal mobility 20 among vehicle information received from the plurality of vehicles 30

The degree of congestion is a measure of the degree of congestion on the driving road of the personal mobility 20 and corresponds to the ratio of the traffic volume of the road traffic to the traffic capacity. The controller 120 may be configured to determine the amount of road traffic on the corresponding road based on the received vehicle information, and may be configured to determine the congestion level based on this. However, determining the congestion level is not limited to this, and the server 10 may be configured to receive and use information about the congestion level from an external server.

The controller 120 according to an exemplary embodiment may be configured to operate the communicator 110 to generate notification information corresponding to the determined risk level and transmit the generated notification information to the vehicle 30. The notification information may include location information regarding the personal mobility 20, information regarding an object to output the notification, information regarding the output content, and the like.

The controller 120 may be configured to determine the notification information so that the target to output the notification increases as the risk level increases. This will be described again in detail later. When the driving position of the personal mobility 20 is sidewalks, the controller 120 may be configured to operate the communicator 110 to determine a risk level for the personal mobility 20 and transmit notification information corresponding to the risk level to the user terminal 40 based on the personal mobility information, the pedestrian information received from the user terminal 40 of the pedestrian located within a preset radius from the personal mobility 20, and the congestion level of the sidewalk.

The pedestrian information may include at least one of a pedestrian position or a pedestrian speed, and may be determined based on a global positioning system (GPS) signal received from the user terminal 40. At this time, the controller 120 may be configured to determine the congestion level of the sidewalks that the personal mobility 20 travels based on the GPS signal received from the user terminal 40, and the congestion level of the sidewalks may correspond to the ratio of the actual sidewalks' capacity to the sidewalks. In this way, the server 10 may have different targets for transmitting notification information corresponding to the risk level for the personal mobility 20 according to the position where the personal mobility 20 travels.

In other words, when the driving position of the personal mobility 20 is a road, the server 10 may be configured to determine the risk level for the personal mobility 20 using the vehicle information and the road congestion, and transmit the notification information to the vehicle 30. In addition, when the driving position of the personal mobility 20 is sidewalks, the server 10 may be configured to determine the risk level for the personal mobility 20 using the pedestrian information and the congestion degree of the sidewalks, and transmit the notification information to the user terminal 40 of the pedestrian.

The controller 120 according to an exemplary embodiment may also be configured to transmit notification information corresponding to a risk level to the personal mobility 20 according to the exemplary embodiment. The controller 120 may include at least one memory in which programs for performing the above-described operations and the operations described below are stored, and at least one processor for executing the stored programs. In the case of a plurality of memory and processors, it may be possible that they are integrated in one chip, and it may also be possible to be provided in a physically separate location.

The storage 130 according to an exemplary embodiment may be configured to store information for operation of the server 10, for example, correlation information between each information and a numerical value, risk level, and correlation between notification information and risk level etc. The storage 130 may be a type of previously known storage medium. In the above, each configuration of the server 10 has been described. Hereinafter, the server 10 will be described in detail with respect to determining the risk level.

Figure 3:
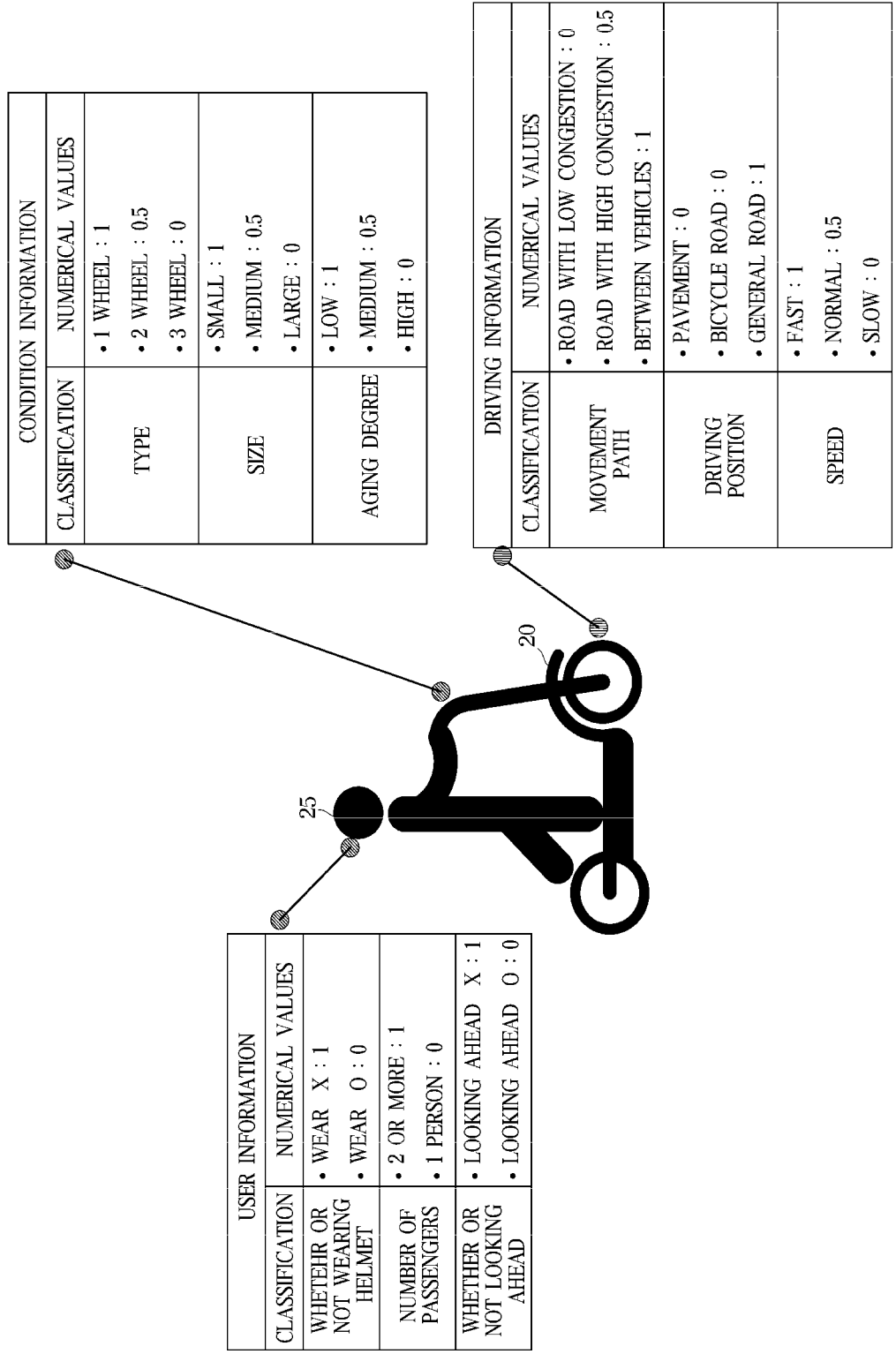
FIG. 3 is a diagram for explaining personal mobility information of personal mobility according to an exemplary embodiment.
Figure 4:
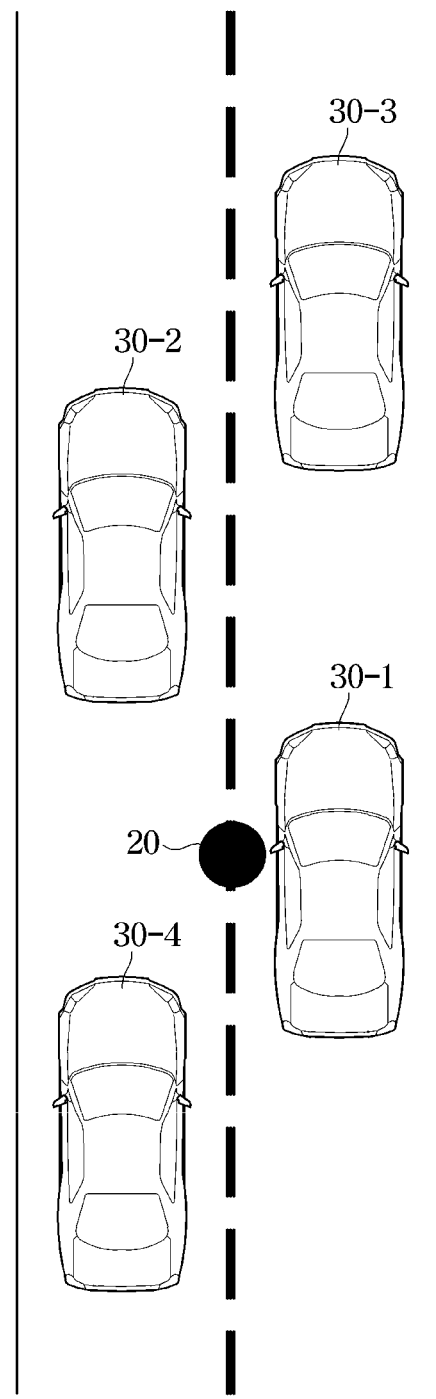
FIG. 4 is a diagram illustrating a case in which a server according to an exemplary embodiment of determines a movement path of personal mobility.
Figure 5:
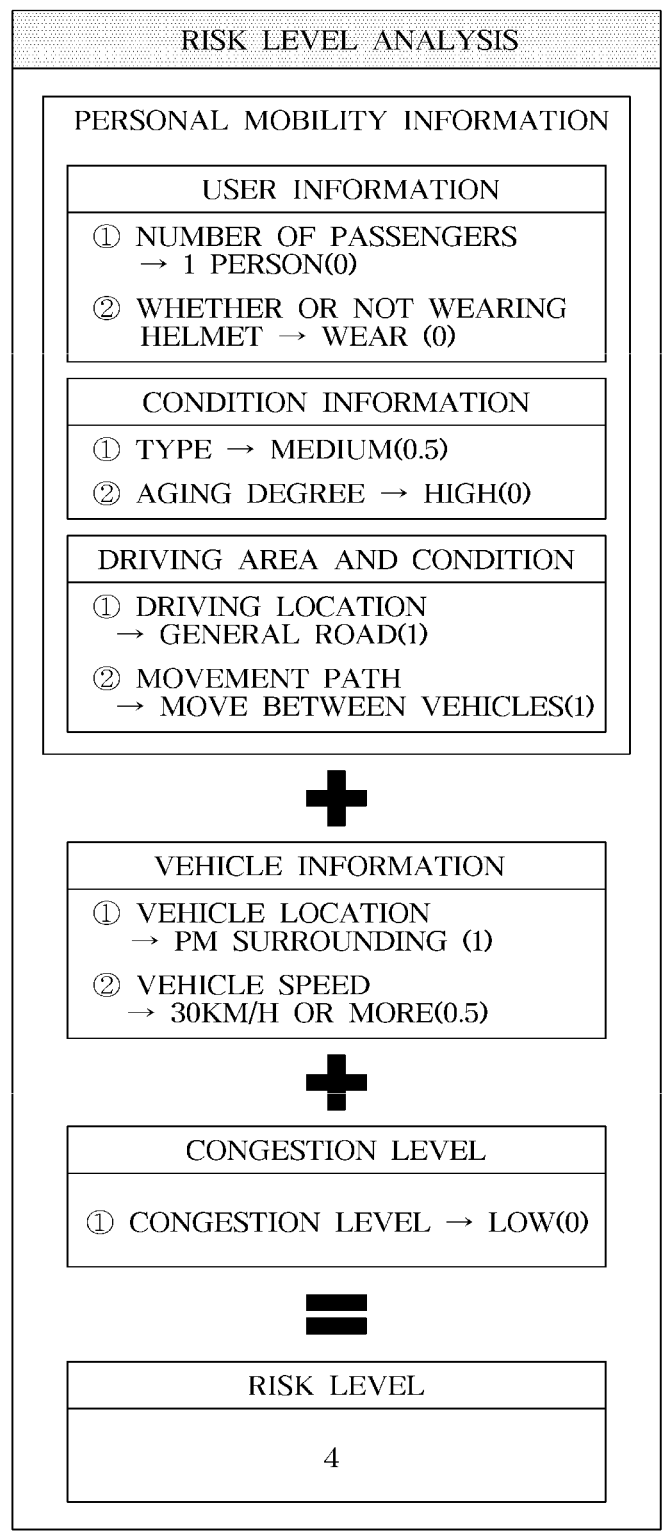
FIG. 5 is a diagram for explaining a case in which the server determines the risk level according to an exemplary embodiment.

FIG. 3 is a diagram for explaining personal mobility 20 information of personal mobility according to an exemplary embodiment. FIG. 4 is a diagram illustrating a case in which a server 10 according to an exemplary embodiment of determines a movement path of personal mobility. FIG. 5 is a diagram for explaining a case in which the server 10 determines the risk level according to an exemplary embodiment. The controller 120 may be configured to determine a risk level for the personal mobility 20 based on personal mobility information received from the personal mobility 20, vehicle information received from the vehicle 30 located within a preset radius from the personal mobility 20, and the congestion degree of the driving road of the personal mobility 20

In particular, the risk level for the personal mobility 20 may be a measure of the possibility of collision with the personal mobility 20 and the scale of accidents when the personal mobility 20 collides with each other. Personal mobility information, as described in FIG. 3, may include at least one of user information of personal mobility 20, condition information of personal mobility 20, and driving information of personal mobility 20. The user information of the personal mobility 20 is information about the user operating the personal mobility 20, and may include at least one of information regarding whether a helmet is worn, information regarding the number of passengers, or whether the person is looking ahead, as measured from a sensor (not shown) of the personal mobility 20.

For example, the personal mobility 20 may be configured to determine whether the personal user has used or worn a helmet based on output of bio signal sensor provided on camera or helmet, and transmit information regarding whether a helmet is worn to the server 10. The controller 120 according to an exemplary embodiment may be configured to determine a corresponding numerical value based on information regarding whether a helmet is worn. Specifically, the controller 120 may be configured to determine a lower value as a corresponding numerical value when the user wears the helmet compared to when the user does not wear the helmet. For example, the controller 120 may be configured to determine "1" as a numerical value when not wearing a helmet, and may be configured to determine "0" as a numerical value when wearing a helmet.

In addition, the personal mobility 20 may be configured to determine the number of passengers based on the output of the camera or load sensor (not shown) provided in the personal mobility 20, and generate and transmit information regarding the number of passengers to the server 10. The controller 120 according to an exemplary embodiment may be configured to determine a corresponding numerical value based on information regarding the number of passengers. Specifically, when there are two or more passengers, the controller 120 may be configured to determine a higher value compared to when the number of passengers is one as a corresponding numerical value. For example, the controller 120 may be configured to determine "1" as a numerical value when there are two or more passengers, and may be configured to determine "0" as a numerical value when there is one passenger.

In addition, the personal mobility 20 may be configured to determine whether to look ahead based on the output of the camera provided in the personal mobility 20, generate information regarding whether the user is looking ahead, and transmit the result to the server 10. The controller 120 according to an exemplary embodiment may be configured to determine a corresponding numerical value based on information regarding whether to look ahead. Specifically, the controller 120 may be configured to determine a lower value as a corresponding numerical value when the user looks forward compared to when the user does not look forward. For example, the controller 120 may be configured to determine "1" as a numerical value when the user does not look forward, and may determine "0" as a numerical value when the user looks forward.

In addition, the condition information of the personal mobility 20 is information indicating the current state of the personal mobility 20, and may include at least one of the types of the personal mobility 20, the size of the personal mobility 20, or the degree of aging of the personal mobility 20. The controller 120 according to an exemplary embodiment may be configured to determine a numerical value corresponding to the type of the personal mobility 20. Specifically, the controller 120 may be configured to determine a numerical value in inverse proportion to the wheel (wheel) of the personal mobility 20. For example, the controller 120 may be configured to determine by value measured "1" for one wheel, "0.5" for two wheels, and "0" for three wheels.

The controller 120 according to an exemplary embodiment may be configured to determine a numerical value corresponding to the size of the personal mobility 20. Specifically, the controller 120 may be configured to determine a numerical value in inverse proportion to the size of the personal mobility 20. (For example, a numeric value corresponding to "small" ("1"), a numeric value corresponding to "medium" ("0.5"), a numeric value corresponding to "large" ("0")) The controller 120 according to an exemplary embodiment may be configured to determine a numerical value that corresponds to aging information of the personal mobility 20. Specifically, the controller 120 may be configured to determine the degree of aging based on the usage history, repair history, and failure history corresponding to the aging information of the personal mobility 20, and may be configured to determine a numerical value in inverse proportion to the aging degree. (Example: Numerical value corresponding to "Low" ("1"), Numerical value corresponding to "Medium" ("0.5"), Numerical value corresponding to "High" ("0"))

In addition, driving information of the personal mobility 20 is information related to driving of the personal mobility 20, may include at least one of the speed of the personal mobility 20, the travel path of the personal mobility 20 or the driving position of the personal mobility 20, and may be determined based on a global positioning system (GPS) signal received from the personal mobility 20. The controller 120 according to an exemplary embodiment may be configured to determine a corresponding numerical value in inverse proportion to the speed of the personal mobility 20. (For example, a numeric value corresponding to "fast" ("1"), a numeric value corresponding to "normal" ("0.5"), and a numeric value corresponding to "slow" ("0")).

The controller 120 according to an exemplary embodiment may be configured to determine a numerical value with a higher value as the driving position of the personal mobility 20 is closer to the road than sidewalks. (For example, a numeric value corresponding to "general road" ("1"), a numeric value corresponding to "bicycle road" ("0.5"), a numeric value corresponding to "sidewalks" ("0")). The controller 120 may be configured to determine a numerical value corresponding to the movement path of the personal mobility 20 to a higher value as the congestion of the movement path of the personal mobility 20 increases. (For example, a numeric value corresponding to "high congestion road" ("0.5"), a numeric value corresponding to "low congestion road" ("0.5")).

At this time, as shown in FIG. 4, when the speed of the vehicles 30-1, 30-2, 30-3, 30-4 located within a preset radius from the personal mobility 20 is less than the speed of the personal mobility 20, and the congestion is greater than a preset reference value, the controller 120 may be configured to determine that the movement path of the personal mobility 20 is between the vehicles 30-1, 30-2, 30-3, and 30-4, thereby maximizing the numerical value corresponding to the movement path of the personal mobility 20 by the value ("1").

However, the controller 120 may be configured to determine that the movement path of the personal mobility 20 is between the vehicles 30 based on image data or radar data received from the vehicle 30, and in response to determining that the location of the vehicle 30 and the location of the personal mobility 20 overlap based on the GPS signal, the controller 120 may be configured to determine that the movement path of the personal mobility 20 is between the vehicles 30.

The vehicle information may include at least one of the location of the vehicle 30 or the speed of the vehicle 30, and may be determined based on a global positioning system (GPS) signal received from the vehicle 30. At this time, the vehicle information may be received from all vehicles 30 existing within a preset radius around the personal mobility 20, which is the object of risk level determination (e.g., using Vehicle-to-vehicle communication). Specifically, the server 10 may use only vehicle information among vehicle information received from a plurality of vehicles 30 based on the location of the vehicle 30 included in the vehicle information corresponding to the vehicle 30 existing within a preset radius around the personal mobility 20 to determine the risk level for the personal mobility 20.

The controller 120 may be configured to determine a corresponding numerical value as a higher value as the position of the vehicle 30 is closer to the personal mobility 20, and determine the numerical value corresponding to the speed of the vehicle 30 as a high value. The controller 120 may be configured to determine the movement path of the personal mobility 20 based on vehicle information received from vehicle 30 existed within preset radius around personal mobility 20 and personal mobility information received from personal mobility 20, the communicator 110 may be operated to transmit notification information corresponding to the moving path to the vehicle 30.

Specifically, the controller 120 may be configured to determine the relative position and the relative speed between the personal mobility 20 and the vehicle 30 when the driving position of the personal mobility 20 is a general road on which the vehicle 30 travels, and determine the movement path of the personal mobility 20 between the vehicles 30 when the relative position is less than the reference distance and the relative speed is greater than or equal to the reference speed, that is, to the side of the vehicle 30, and operate the communicator 110 to transmit notification information warning the approach of the personal mobility 20 to the vehicle 30 by determining that the risk level is high.

The degree of congestion is a measure of the degree of congestion on the driving road of the personal mobility 20 and corresponds to the ratio of the traffic volume of the road traffic to the traffic capacity. The controller 120 may be configured to determine the amount of road traffic on the corresponding road based on the received vehicle information, and determine the congestion level based on this. However, determining the congestion level is not limited to this, and the server 10 may be configured to receive and use information about the congestion level from an external server.

At this time, the controller 120 according to an exemplary embodiment may be configured to determine a corresponding numerical value in proportion to the congestion degree. The controller 120 may be configured to calculate personal mobility information, vehicle information, and pedestrian information based on raw data (e.g., GPS signals, image data, etc.) received from external electronic devices such as the personal mobility 20, the vehicle 30, and the user terminal 40

As illustrated in FIG. 5, the controller 120 may be configured to determine a risk level by summing numerical values corresponding to each of personal mobility information, vehicle information, and congestion. For example, the controller 120 may be configured to determine "4" as the corresponding risk level by summing up "0.5" corresponding to the type of the personal mobility 20, "1" corresponding to the travel position of the personal mobility 20, "1" corresponding to the movement path of the personal mobility 20", "1" corresponding to the position of the vehicle 30 and "0.5" corresponding to the speed of the vehicle 30.

Figure 6:
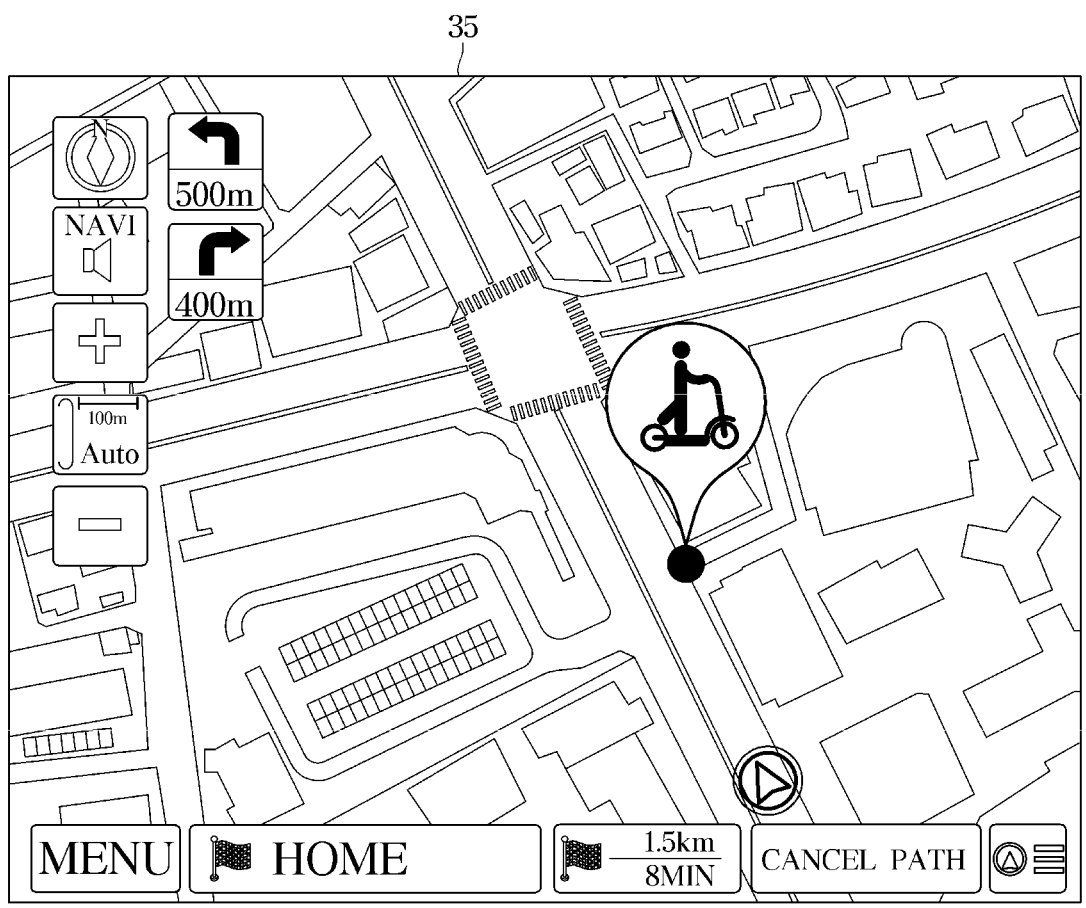
FIG. 6 is a diagram illustrating a case in which a server according to an exemplary embodiment of transmits notification information to a vehicle.

FIG. 6 is a diagram illustrating a case in which a server 10 according to an exemplary embodiment of transmits notification information to a vehicle 30. Referring to FIG. 6, the controller 120 may be configured to operate the communicator 110 to generate notification information corresponding to the determined risk level and transmit the generated notification information to the vehicle 30.

At this time, the notification information may include location information about the personal mobility 20, information about an object to output the notification, information about the output content, and the like. For example, as shown in FIG. 6, when receiving notification information from the server 10, the vehicle 30 may be configured to display the location of the personal mobility 20 on a map of the display 35 provided inside the vehicle 30 based on the notification information.

The controller 120 according to an exemplary embodiment may be configured to determine notification information such that an object to output a notification increases as a risk level increases. In particular, the controller 120 may be configured to generate notification information such that a cluster (not shown), an indoor light (not shown), or a speaker (not shown) additionally outputs a notification as the risk level increases.

For example, the controller 120 may be configured to generate notification information for the display 35 and the cluster to output a notification (e.g., the location of the personal mobility 20, a warning display) when the risk level exceeds a preset first reference value. In addition, when the risk level exceeds a preset second reference value, the controller 120 may be configured to generate notification information outputting notification (for example, the location of the personal mobility 20, a warning display, an around view monitor (AVM), ambient light, warning sound etc.).

In addition, the controller 120 may be configured to determine the notification information so that the output content is added as the risk level increases. For example, in response to determining that the risk level exceeds a preset third reference value, in addition to the display 35 displaying the location of the personal mobility 20, the controller 120 may be configured to generate notification information such that an image (e.g., AVM) around the vehicle 30 is displayed.

At this time, the vehicle 30 may be configured to operate each configuration or component (e.g., display 35) of the vehicle 30 to output a notification based on the notification information received from the server 10, and output the notification to start when the distance between the personal mobility 20 and the vehicle 30 becomes equal to or less than a preset distance.

Figure 7:
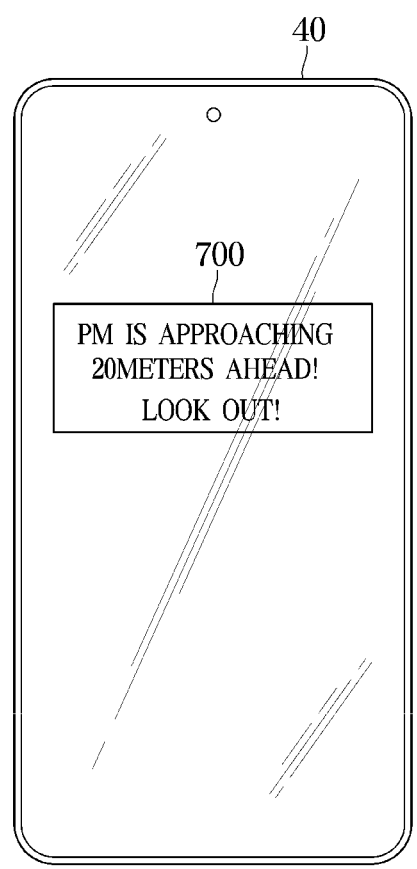
FIG. 7 is a diagram illustrating a case in which a server according to an exemplary embodiment transmits notification information to a user terminal.

FIG. 7 is a diagram illustrating a case in which a server 10 according to an exemplary embodiment transmits notification information to a user terminal 40. Referring to FIG. 7, the controller 120 may be configured to determine risk level for personal mobility 20 based on congestion level of sidewalks and pedestrian information received from user terminal of pedestrian located within preset radius from personal mobility, personal mobility information when the driving position of the personal mobility 20 is sidewalks, and operate the communicator 110 to transmit notification information (e.g.: at least one of warning display 700 or warning sound) corresponding to risk level.

The pedestrian information may include at least one of a pedestrian position or a pedestrian speed, and may be determined based on a global positioning system (GPS) signal received from the user terminal 40. The controller 120 may be configured to determine a numerical value corresponding to pedestrian information to a higher value as the pedestrian is positioned closer to the personal mobility 20, and determine a higher numerical value as the pedestrian speed increases.

Further, the controller 120 may be configured to determine the congestion level of the sidewalks on which the personal mobility 20 travels based on the GPS signal received from the user terminal 40, and the congestion level of the sidewalks may correspond to the ratio of the sidewalks capacity of the actual pedestrians. The controller 120 may be configured to determine a corresponding numerical value in proportion to the congestion degree of sidewalks. Additionally, the controller 120 may be configured to determine movement path for personal mobility 20 based on pedestrian information received from user terminal 40 of pedestrian located within preset radius from personal mobility 20 and personal mobility information, and operate communicator 110 to transmit notification information to user terminal 40.

Specifically, the controller 120 may be configured to determine a relative position and a relative speed between the personal mobility 20 and the user terminal 40 when the driving position of the personal mobility 20 is sidewalks. When the relative position is less than the reference distance and the relative speed is greater than the reference speed, the controller 120 may be configured to determine the movement path of the personal mobility 20 is between pedestrians, that is, on the side of the pedestrian, and the risk level is determined to be high. Then, the communicator 110 may be operated to transmit notification information warning the access of the personal mobility 20 to the user terminal 40.

Accordingly, the server 10 may have different targets for transmitting notification information corresponding to the risk level for the personal mobility 20 according to the location where the personal mobility 20 travels. In other words, when the driving position of the personal mobility 20 is a road, the server 10 may be configured to determine the risk level for the personal mobility 20 using the vehicle information and the road congestion, and transmit the notification information to the vehicle 30. In addition, when the driving position of the personal mobility 20 is sidewalks, the server 10 may be configured to determine the risk level for the personal mobility 20 using the pedestrian information and the congestion degree of the sidewalks, and transmit notification information to the user terminal 40 of the pedestrian.

According to an exemplary embodiment, the controller 120 according to an exemplary embodiment may also be configured to transmit notification information corresponding to a risk level to the personal mobility 20. In particular, the notification information includes information about an object for outputting a notification according to a risk level (for example, a display provided in the personal mobility 20, a user terminal (not shown) of the user of the personal mobility 20, etc.) and information about the output content.

Hereinafter, a control method of the server 10 according to an exemplary embodiment will be described. The server 10 according to the above-described exemplary embodiment may be applied to the control method of the server 10 described later. Therefore, the contents described with reference to FIGS. 1 to 7 are equally applicable to the control method of the server 10 according to an exemplary embodiment even if there is no special mention.

Figure 8:
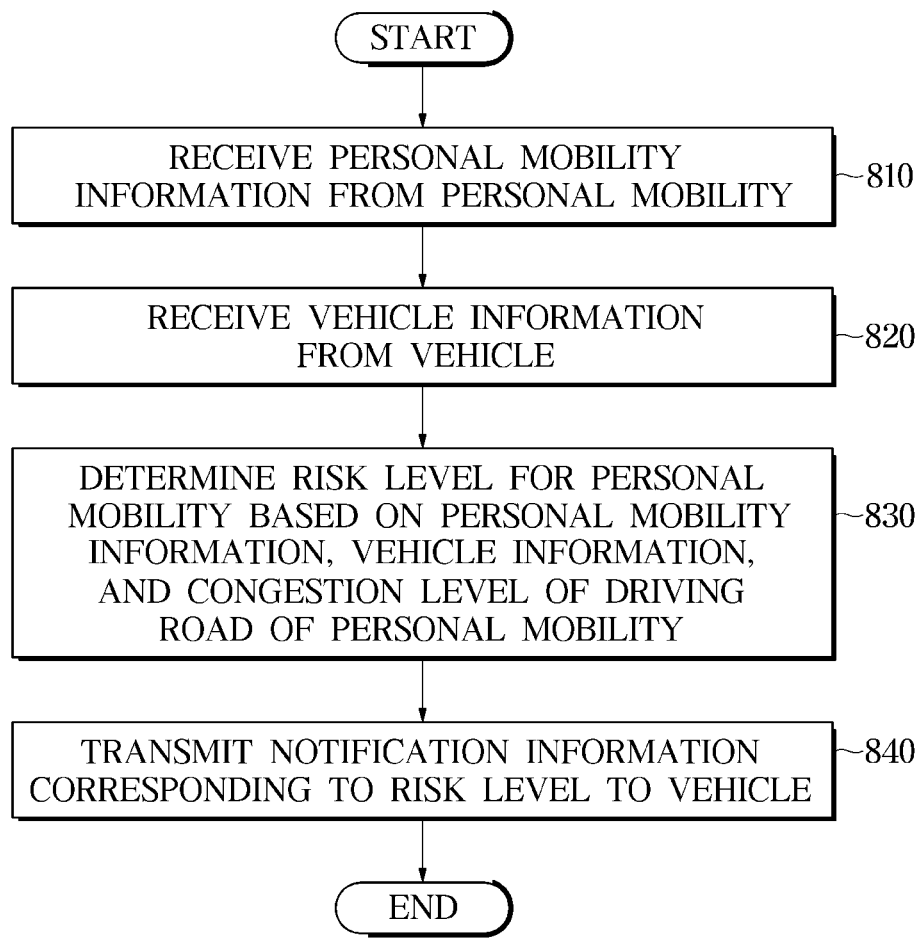
FIG. 8 is a flowchart illustrating a case in which notification information about a risk of personal mobility is transmitted among control methods of a server according to an exemplary embodiment.

FIG. 8 is a flowchart illustrating a case in which notification information about a risk of personal mobility 20 is transmitted among control methods of a server 10 according to an exemplary embodiment. Referring to FIG. 8, server 10 according to exemplary embodiment received personal mobility information from personal mobility 20 (810), and received vehicle information from vehicle 30 (820).

The server 10 may be configured to determine risk level for personal mobility 20 based on congestion level of driving road of personal mobility 20, vehicle information, and personal mobility information (830). The controller 120 may be configured to determine a risk level for the personal mobility 20 based on Personal mobility information received from the personal mobility 20, vehicle information received from the vehicle 30 located within a preset radius from the personal mobility 20, and the congestion level of the driving road of the personal mobility 20.

In particular, the risk level for the personal mobility 20 may be a measure of the possibility of collision with the personal mobility 20 and the scale of accidents when the personal mobility 20 collides with each other. Specifically, the controller 120 may be configured to determine a risk level by summing numerical values corresponding to each of personal mobility information, vehicle information, and congestion level.

The personal mobility information may include at least one of user information of the personal mobility 20, condition information of the personal mobility 20, and driving information of the personal mobility 20. The user information of the personal mobility 20 is information about the user operating the personal mobility 20. The user information of the personal mobility 20 may include at least one of information regarding whether a helmet is worn from a sensor (not shown) of the personal mobility 20, information regarding the occupant, or whether the person is looking ahead.

In addition, the state information of the personal mobility 20 is information indicating the current state of the personal mobility 20, among at least one of types of the personal mobility 20, the size of the personal mobility 20, or the degree of aging of the personal mobility 20. The status information of the personal mobility 20 is information indicating the current status of the personal mobility 20, and may include at least one of the type of the personal mobility 20, the size of the personal mobility 20 or the degree of aging of the personal mobility 20.

The driving information of the personal mobility 20 is information related to the driving of the personal mobility 20, and may include at least one of the speed of the personal mobility 20, the travel path of the personal mobility 20 or the driving position of the personal mobility 20, and may be determined based on a global positioning system (GPS) signal received from the personal mobility 20. At this time, the controller 120 may be configured to determine a numerical value corresponding to each information based on each information included in the personal mobility information.

For example, if the speed of the vehicle 30 is less than the speed of the personal mobility 20 and the congestion is greater than a preset reference value, the controller 120 may be configured to determine that the movement path of the personal mobility 20 is between the vehicles 30, and the numerical value corresponding to the movement path of the personal mobility 20 may be determined as the maximum value.

The controller 120 may be configured to determine a numerical value corresponding to personal mobility information by summing the numerical values determined corresponding to each information. Accordingly, the controller 120 may be configured to determine a numerical value corresponding to the personal mobility information by determining a numerical value for each information included in the personal mobility information, and finally determine a risk level for the personal mobility 20.

The vehicle information may include at least one of the location of the vehicle 30 or the speed of the vehicle 30, and may be determined based on a global positioning system (GPS) signal received from the vehicle 30. At this time, the vehicle information may be received from all vehicles 30 existing within a preset radius around the personal mobility 20, which is the object of risk level determination. Specifically, the server 10 may use only vehicle information corresponding to the vehicle 30 existing within a preset radius to determine the risk level for the personal mobility 20 based on the position of the vehicle 30 included in the vehicle information, focusing on the personal mobility 20 among vehicle information received from the plurality of vehicles 30

The degree of congestion is a measure of the degree of congestion on the driving road of the personal mobility 20 and corresponds to the ratio of the traffic volume of the road traffic to the traffic capacity. The controller 120 may be configured to determine the amount of road traffic on the corresponding road based on the received vehicle information, and determine the congestion level based on this. However, determining the congestion level is not limited to this, and the server 10 may be configured to receive and use information about the congestion level from an external server.

The server 10 according to an exemplary embodiment may be configured to transmit notification information corresponding to the risk level to the vehicle 30 (840). The controller 120 according to an exemplary embodiment may be configured to operate the communicator 110 to generate notification information corresponding to the determined risk level and transmit the generated notification information to the vehicle 30. At this time, the notification information may include location information about the personal mobility 20, information about a target to output the notification, information about the output content, and the like. The controller 120 may be configured to determine the notification information so that the target to output the notification increases as the risk level increases.

Figure 9:
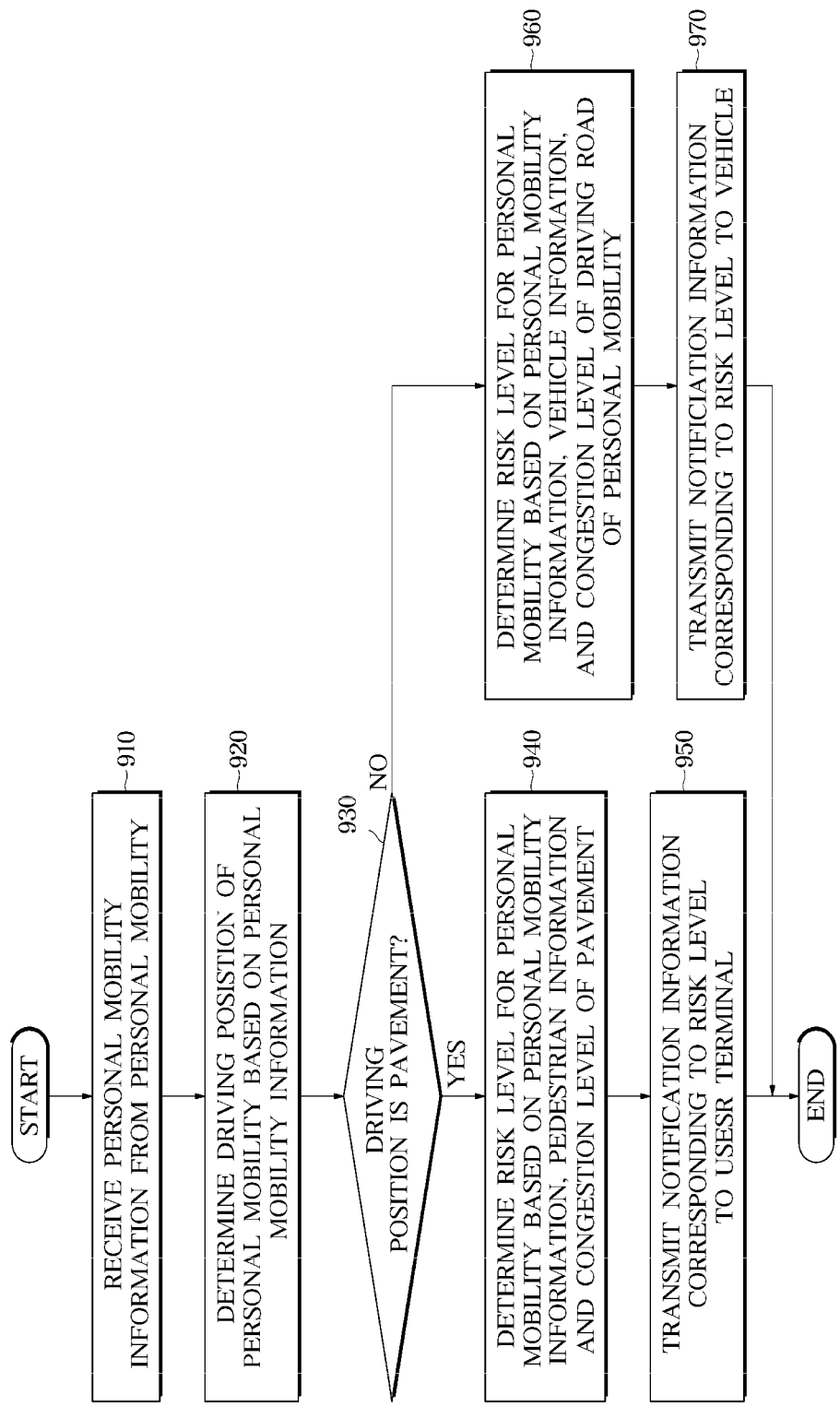
FIG. 9 is a flowchart illustrating a case in which notification information is transmitted according to a driving position of personal mobility among control methods of a server according to an exemplary embodiment.

FIG. 9 is a flowchart illustrating a case in which notification information is transmitted according to a driving position of personal mobility among control methods of a server 10 according to an exemplary embodiment. Referring to FIG. 9, the server 10 according to an exemplary embodiment may be configured to receive personal mobility information from the personal mobility 20 (910), and determine the driving position of the personal mobility 20 based on the personal mobility information (920).

Specifically, the controller 120 may be configured to determine the driving position of the personal mobility 20 based on road condition information outputting from vibration sensor of personal mobility 20 and forward image data of personal mobility 20 included in the personal mobility information. The server 10 according to an exemplary embodiment may be configured to determine a risk level for personal mobility based on the mobility of the sidewalks (YES in 930), personal mobility information, pedestrian information, and sidewalks (940), and transmit notification information corresponding to the risk level to the user terminal (950).

When the driving position of the personal mobility 20 is sidewalks, the controller 120 may be configured to operate the communicator 110 to determine a risk level for the personal mobility 20 and transmit notification information corresponding to the risk level to the user terminal 40 based on the personal mobility information, the pedestrian information received from the user terminal 40 of the pedestrian located within a preset radius from the personal mobility 20, and the congestion level of the sidewalk.

The pedestrian information may include at least one of a pedestrian position or a pedestrian speed, and may be determined based on a global positioning system (GPS) signal received from the user terminal 40. At this time, the controller 120 may be configured to determine the congestion level of the sidewalks that the personal mobility 20 travels based on the GPS signal received from the user terminal 40, and the congestion level of the sidewalks may correspond to the ratio of the actual sidewalks' capacity to the sidewalks.

The server 10 according to an exemplary embodiment, when the driving position is not sidewalks (No in 930), a risk level for the personal mobility 20 may be determined based on the personal mobility information, the vehicle information, and the congestion degree of the driving road of the personal mobility 20 (960), notification information corresponding to the risk level may be transmitted to the vehicle 30 (970). Accordingly, the server 10 may have different targets for transmitting notification information corresponding to the risk level for the personal mobility 20 according to the location where the personal mobility 20 travels.

In other words, when the driving position of the personal mobility 20 is a road, the server 10 may be configured to determine the risk level for the personal mobility 20 using the vehicle information and the road congestion, and transmit the notification information to the vehicle 30. In addition, when the driving position of the personal mobility 20 is sidewalks, the server 10 may be configured to determine the risk level for the personal mobility 20 using the pedestrian information and the congestion degree of the sidewalks, and transmit the notification information to the user terminal 40 of the pedestrian.

The non-transitory computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

In accordance with an aspect of the present disclosure, it may be possible to provide a vehicle and a controlling method thereof capable of providing efficient autonomous driving by changing the detection range and power consumption of the sensor according to the speed of the vehicle.

DESCRIPTION OF SYMBOLS

1: risk level notification system
10: server
110: communicator
120: controller
130: communicator
20: personal mobility
30: vehicle
40: user terminal

What is claimed is:

1. A device for monitoring an individual released from custody, comprising:
 a communicator;
 a controller configured to determine risk level for personal mobility based on personal mobility information received from the personal mobility, vehicle information received from vehicle located within a preset radius from the personal mobility, and congestion level of driving road of the personal mobility, and operate the communicator to transmit notification information corresponding to the risk level to the vehicle,
 wherein the controller is configured to determine the risk level by summing numerical values corresponding to each of the personal mobility information, the vehicle information, and the congestion level.

2. The server according to claim 1, wherein the personal mobility information includes at least one of user information of the personal mobility, condition information of the personal mobility, and driving information of the personal mobility.

3. The server according to claim 2, wherein the user information of the personal mobility includes at least one of information regarding whether to wear a helmet measured from sensor of the personal mobility, information regarding boarding personnel, or information regarding whether to look ahead.

4. The server according to claim 2, wherein the condition information of the personal mobility includes at least one of type of the personal mobility, size of the personal mobility, or aging degrees of the personal mobility.

5. The server according to claim 2, wherein the driving information of the personal mobility includes at least one of speed of the personal mobility, a movement path of the personal mobility or a driving position of the personal mobility.

6. The server according to claim 5, wherein the controller is configured to determine numerical values corresponding to the movement path of the personal mobility as a maximum value by determining that the movement path of the personal mobility is between the vehicles when the speed of the vehicle is less than the speed of the personal mobility and the congestion degree is greater than a preset reference value.

7. The server according to claim 6, wherein the controller is configured to determine the danger degree of the personal mobility based on the personal mobility information, a pedestrian information received from user terminal of the pedestrian located with a preset radius from the personal mobility, and congestion degree of pavement, and operate the communicator to transmit notification information corresponding to the danger degree to the user terminal when the driving position of the personal mobility is the pavement.

8. The server according to claim 7, wherein the pedestrian information includes at least one of position of the pedestrian or speed of the pedestrian.

9. The server according to claim 1, wherein the vehicle information includes at least one of position of the vehicle or speed of the vehicle.

10. A controlling method of a server including a communicator, comprising:
 determining, by a controller, a risk level for personal mobility based on personal mobility information received from the personal mobility, vehicle information received from vehicle located within a preset radius from the personal mobility, and congestion level of driving road of the personal mobility, and
 operating, by the controller, the communicator to transmit notification information corresponding to the risk level to the vehicle,
 wherein determining the risk level for the personal mobility includes determining the risk level by summing numerical values corresponding to each of the personal mobility information, the vehicle information, and the congestion level.

11. The method according to claim 10, wherein the personal mobility information includes at least one of user information of the personal mobility, condition information of the personal mobility, and driving information of the personal mobility.

12. The method according to claim 11, wherein the user information of the personal mobility includes at least one of information regarding whether to wear a helmet measured from sensor of the personal mobility, information regarding boarding personnel, or information regarding whether to look ahead.

13. The method according to claim 11, wherein the condition information of the personal mobility includes at least one of type of the personal mobility, size of the personal mobility, or aging degrees of the personal mobility.

14. The method according to claim 11, wherein the driving information of the personal mobility includes at least one of speed of the personal mobility, a movement path of the personal mobility or a driving position of the personal mobility.

15. The method according to claim 14, wherein determining the danger degree of the personal mobility includes: determining numerical values corresponding to the movement path of the personal mobility as a maximum value by determining that the movement path of the personal mobility is between the vehicles when the speed of the vehicle is less than the speed of the personal mobility and the congestion degree is greater than a preset reference value.

16. The method according to claim 14 further comprising:
 determining, by the controller, the danger degree of the personal mobility based on the personal mobility information, a pedestrian information received from user terminal of the pedestrian located with a preset radius from the personal mobility, and congestion degree of pavement, and
 operating, by the controller, the communicator to transmit notification information corresponding to the danger degree to the user terminal when the driving position of the personal mobility is the pavement.

17. The method according to claim 16, wherein the pedestrian information includes at least one of position of the pedestrian or speed of the pedestrian.

18. The method of according to claim 10, wherein the vehicle information includes at least one of position of the vehicle or speed of the vehicle.

* * * * *